United States Patent [19]

Bechtel

[11] 3,946,297
[45] Mar. 23, 1976

[54] INSERTION INTEGRATING CONTROLLER
[75] Inventor: Jon Harold Bechtel, Goshen, Ind.
[73] Assignee: Johnson Service Company, Milwaukee, Wis.
[22] Filed: Mar. 5, 1974
[21] Appl. No.: 448,366

[52] U.S. Cl. .............................. 318/609; 236/78 D
[51] Int. Cl.² ....................................... G05B 11/42
[58] Field of Search ....... 236/158, 78; 318/609, 610

[56] References Cited
UNITED STATES PATENTS

| | | | |
|---|---|---|---|
| 3,197,711 | 7/1965 | Richardson | 330/103 |
| 3,221,257 | 11/1965 | Ohlson | 236/78 X |
| 3,391,317 | 7/1968 | Bell | 318/611 |
| 3,441,836 | 4/1969 | Riley | 318/609 X |
| 3,510,737 | 5/1970 | Brown et al. | 318/621 X |
| 3,842,615 | 10/1974 | Reigel et al. | 236/78 |

Primary Examiner—William E. Wayner
Attorney, Agent, or Firm—Johnson, Dienner, Emrich & Wagner

[57] ABSTRACT

A proportional plus integral controller connectable in a conventional proportional control loop of a process control system is selectively operable in a proportional only mode or a proportional plus integral mode in accordance with the positioning of a mode select switch and exhibits substantially bumpless forward transfer from proportional only to proportional plus integral operating modes.

14 Claims, 3 Drawing Figures

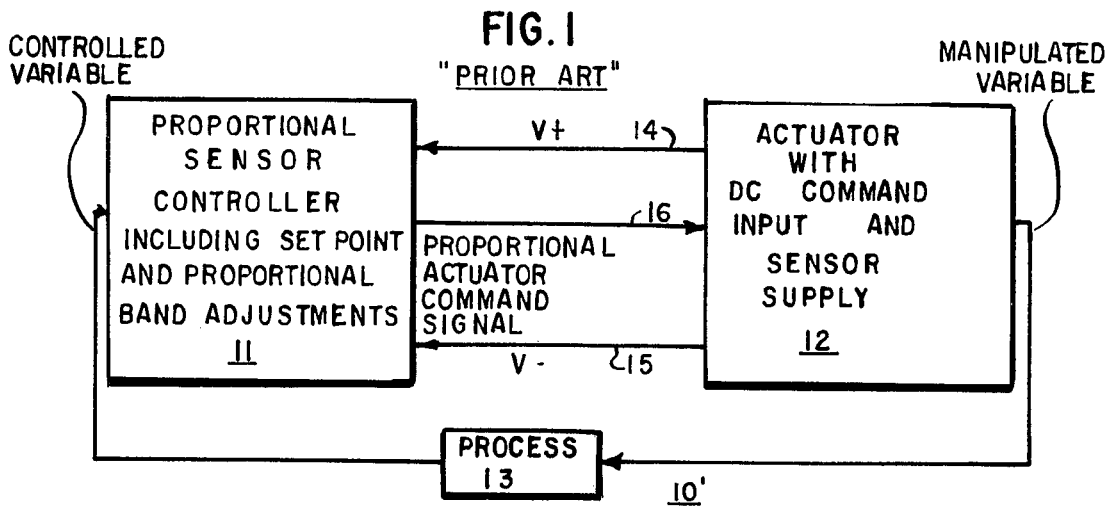
FIG. 1 "PRIOR ART"
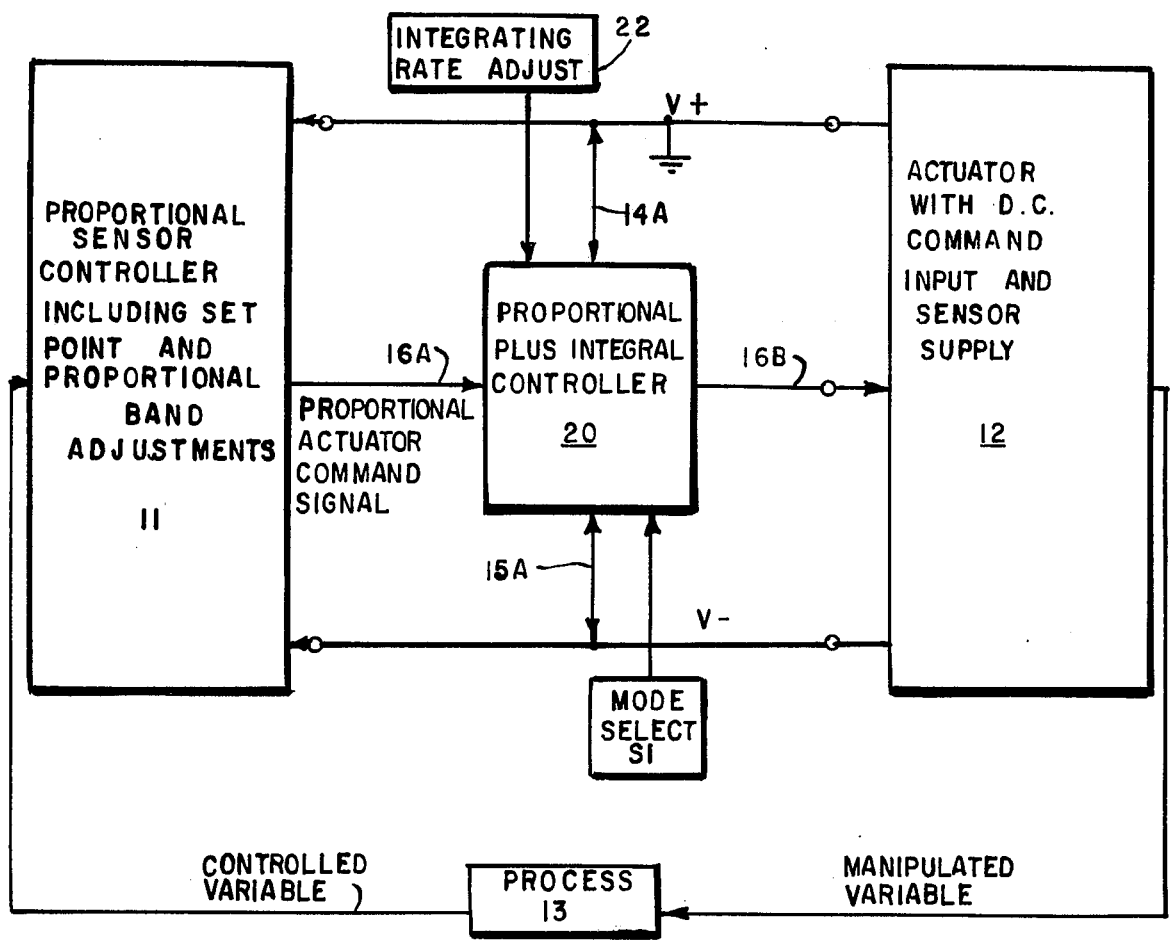
FIG. 2

INSERTION INTEGRATING CONTROLLER

BACKGROUND OF THE INVENTION

1. Field of the Invention

This invention relates to process control systems, and more particularly to a proportional plus integral controller for use in such systems.

2. Description of the Prior Art

Proportional controllers are employed in process control systems to enable a controlled system variable to be maintained at a system set point by providing a feedback signal related in amplitude and polarity to deviations of the controlled variable from the set point.

In such systems, the controlled variable is monitored by a condition sensing device which provides a linearly changing command signal indicative of deviations of the controlled variable from the system set point. A process control apparatus is responsive to the command signal to effect an adjustment in the value of the manipulated variable to maintain the controlled variable at the system set point.

For example, in a heating or air conditioning control system, the controlled variable may be the temperature of a given enclosure or room and the manipulated variable may be hot air under pressure admitted to the enclosure or room. The condition sensing device may include a thermostat located in the room, which provides a position command to an actuator device. This position command is proportional to the difference between the room temperature and the thermostat set point temperature. The actuator device responsively controls the positioning of a damper to increase or decrease the rate at which hot air is admitted into the room or enclosure in accordance with the heating requirements of the room.

In known proportional controllers which provide only proportional action, the deviation of the controlled variable from the set point, or error, is never fully eliminated since it is necessary for an error to exist to command a system output other than the one neutral output at which the system was calibrated. This inherant deviation between the actual process condition, or controlled variable, and the desired process condition, or set point, is commonly referred to as "droop". In comfort control loops, a relatively small droop can be felt by human occupants of a temperature controlled space.

Droop may be lowered through the use of a high gain amplifier in the proportional control loop. However, system stability requirements place a limit on the highest attainable gain and thus, on the minimum droop. Droop is eliminated through the use of controllers which provide proportional plus automatic reset action, sometimes called integral action.

Although proportional plus integral controllers provide the desired elimination of droop, control loops employing an automatic reset control function are characterized by large overshoots in the event of process upsets as may be caused by start-up or large changes in set point, for example. In such instances, it may be desirable to provide only proportional action until the controlled variable approaches the set point and then to perform a bumpless transfer to the proportional plus integral mode. It is also desirable to switch to a proportional only mode to make an initial adjustment of the loop proportional gain in order to adjust the controller for near optimum response.

It is also desirable to add the proportional plus integral feature to existing control loops by simply cutting the lines between the controller sensor and the actuator and inserting the proportional plus integral package.

It is also desirable to retain the set point and proportional gain control in the proportional sensor controller.

SUMMARY OF THE INVENTION

It is therefore an object of the present invention to provide a proportional plus integral controller for use in a process control system which is selectively operable in either proportional only or proportional plus integral modes.

It is another object of the present invention to provide a proportional plus integral controller which may be inserted directly into an existing proportional control loop between a proportional sensor controller and command actuator, and which provides bumpless forward transfer from proportional only operation to proportional plus integral operation.

It is yet another object of the present invention to provide a proportional plus integral controller for use in a conventional proportional control loop between a proportional sensor controller means and a command actuator in which set point and gain adjustments of the conventional proportional control loop remain operational.

These and other objects are achieved by the present invention which has provided in insertion integrator for use in a process control system having a proportional control loop including a sensor controller and an actuator operable to maintain a controlled process variable at a system set point. The sensor controller provides a linearly changing command signal indicating deviations of the controlled variable from the set point and the actuator is responsive to the command signal to control a manipulated process variable to effect a change in the controlled variable to return the controlled variable to the set point.

In accordance with the invention, the insertion integrator is connected in the line between the sensor controller and the actuator and is operable in a first mode to respond to the command signal and provide a modified command signal, having a proportional component and an integral component, for the actuator. The insertion integrator is operable in a second mode to extend the command signal provided by the sensor controller directly to the actuator. The insertion integrator includes a switch means which enables selection of the mode of operation of the insertion integrator.

In accordance with one embodiment, the insertion integrator comprises a differential amplifier means having first and second inputs and an output. An integrating capacitor is connected between the first amplifier input and the amplifier output. A network supplies a proportional signal as a common mode voltage level at both amplifier inputs and the integrator input signal as a current input to the capacitor. The integrator command signal is referenced to a point half way between the extremes of the input signal range.

In the proportional plus integral mode of operation, the differential amplifier means is enabled by a switch means to provide the modified command signal which has a component proportional to the command signal and a component proportional to the time integral of the command signal relative to its 50% value.

In the proportional only mode, the switch means disables the differential amplifier means and extends the command signal directly from the output of the sensor controller to the actuator. In addition, the switch means extends the command signal to the integrating capacitor to permit it to track the command signal while the insertion integrator is in the proportional only mode. This enables bumpless transfer when the insertion integrator is switched to the proportional plus integral mode.

Thus, the insertion integrator can be inserted into a conventional proportional control loop and requires minimal alteration of normal proportional application procedures. In such application, the sensor controller set point and gain adjustments remain operational. Moreover, the initial gain adjustment procedure for a conventional proportional control loop modified to include the insertion integrator is similar to that established for the proportional control loop without the insertion integrator. The proportional gain is increased until the system is just stable with the unit in the proportional only mode. The integrator gain is then increased until the system is just stable in the proportional plus integral mode. This adjustment procedure results in satisfactory performance for a wide range of normally encountered control loops.

The insertion integrator may be inserted directly into the lines which normally interconnect the sensor controller and the actuator. Even the power for the unit is furnished by those lines. Thus, installation procedures are considerably simpler than those required for known commercially available proportional plus integral controllers.

Other objects and advantages of the present invention will become apparent from the detailed description which makes reference to the accompanying drawings.

DESCRIPTION OF THE DRAWINGS

FIG. 1, labelled "Prior Art", is a simplified block diagram of a known proportional control system;

FIG. 2 is a simplified block diagram of the proportional control system shown in FIG. 1, which includes an insertion integrator provided by the present invention; and, FIG. 3 is a schematic circuit diagram of the insertion integrator provided by the present invention.

DESCRIPTION OF A PREFERRED EMBODIMENT

Figure 3:
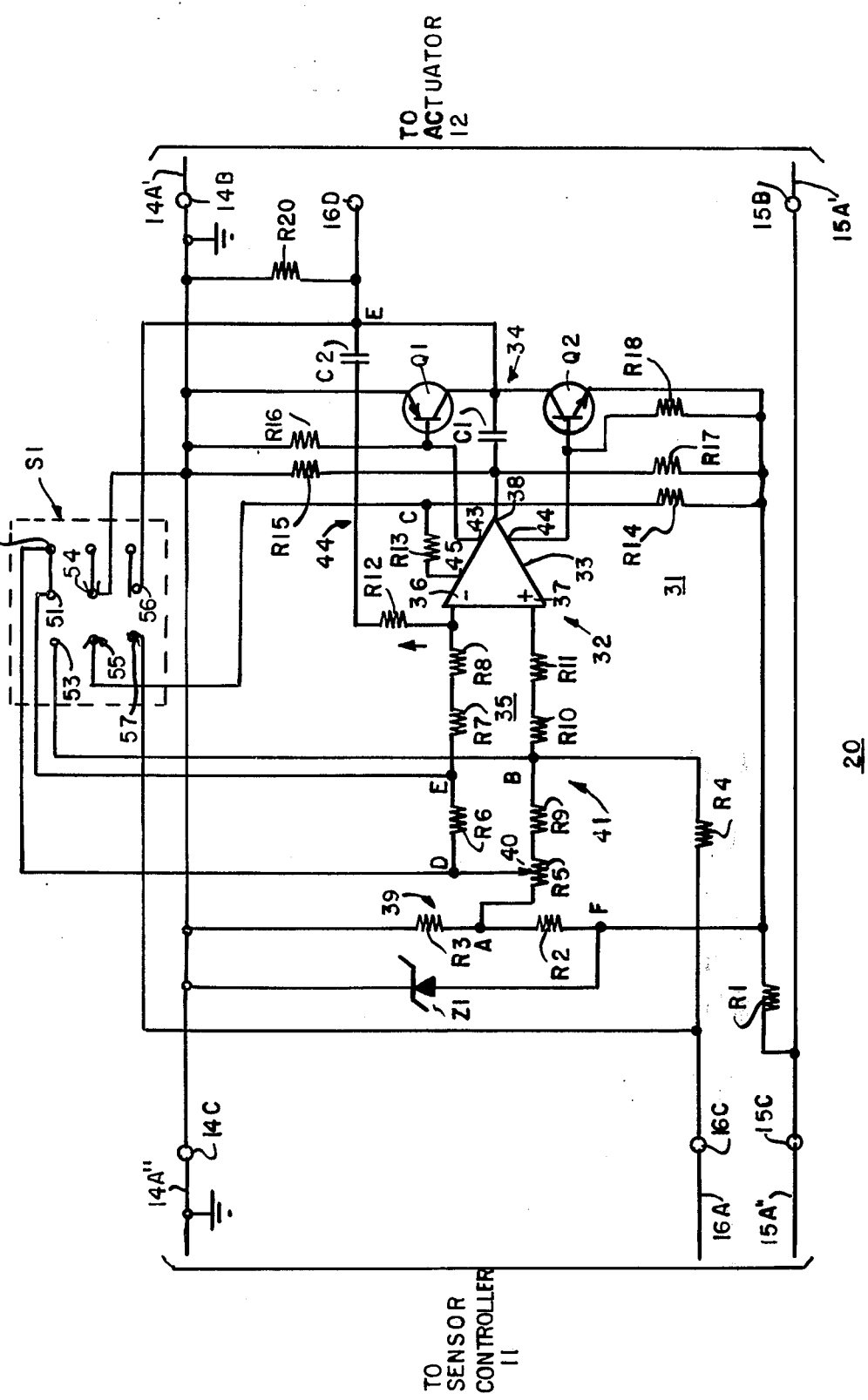

Referring to FIG. 1, which is labelled "Prior Art", there is shown a block diagram of a known automatic control system 10' having a proportional controller connected in a proportional control loop. The proportional control loop includes a proportional sensor controller 11 and an actuator 12 which enable a controlled process variable to be maintained at a system set point.

By way of example, the process, represented by block 13, may be a heating or air conditioning system. In such system, the manipulated variable, for example, may be warm or cool air under pressure admitted to an enclosure or room at a rate controlled by the opening or closing of a damper, and the controlled variable may be the temperature of the enclosure or room. In such application, the proportional sensor controller 11 may include a thermostat which provides an output proportional to the difference of the room and set point temperatures. This output is the command signal for the actuator 12.

The proportional controller is responsive to command signals within a preselected proportional band as determined by a proportional band adjust associated with the proportional sensor controller 11.

The proportional sensor controller 11 receives power from the actuator circuit 12 over conductors 14 and 15, and the command signal, provided by the proportional sensor controller 11, is extended to the actuator 12 over a conductor 16. This signal is referenced to the potential of conductor 14 which is normally grounded. The actuator 12 is responsive to the command signal to effect a change in the manipulated variable as, for example, by opening or closing a damper to permit an increase or decrease in the amount of warm or cool air admitted to the enclosure or room. Such action effects a change in the controlled variable, or temperature, as the temperature of the enclosure increases or decreases causing the controlled variable to approach the system set point and correspondingly effecting a decrease in the error signal.

Referring to FIG. 2, there is shown a block diagram of an automatic control system 10 including an insertion integrator circuit 20 provided by the present invention which is inserted into a conventional proportional control loop of a process control system, such as the one shown in FIG. 1.

As shown in FIG. 2, the insertion integrator 20 is interposed between the proportional sensor controller 11 and the actuator circuit 12. The insertion integrator 20 obtains power from the actuator circuit 12 over conductors 14A and 15A. The command signal provided by the proportional sensor controller 11 is extended to the insertion integrator over a conductor 16A.

The system set point and proportional band adjustments of the system of FIG. 1 remain operational, such adjustments being made by the set point control and the proportional band adjust control associated with the proportional sensor controller 11.

The insertion integrator 20 is operable in first and second modes to provide proportional only and proportional plus integral action, respectively. In the proportional only mode, the command signal provided on conductor 16A is extended directly to the actuator 12 over conductor 16B. In the proportional plus integral mode, the insertion integrator 20 is operable to provide a modified command signal, having proportional and integral components, which is extended to the actuator 12 over conductor 16B.

The mode of operation for the insertion integrator 20 is selected by a mode selector switch S1. The proportional only mode is generally used for start up or in the event of a large change in the set point. The insertion integrator is kept in the proportional mode until the set point and proportional band adjustments of the proportional sensor controller 11 and actuator 12 are complete, and normal, satisfactory proportional control is observed. At such time, the insertion integrator 20 is switched to the proportional plus integral mode.

If at this time, the proportional sensor controller 11 output 16A is at the mid point of its range, the system continues to operate with no change. If, however, the proportional sensor controller 11 is sending some value other than this, there is no immediate change in the system, but the insertion integrator slews the command signal 16B at a rate proportional to the difference between the signal 16A and its mid point value. The actuator 12 and subsequently the controlled condition changes in the direction to bring the output of the proportional sensor controller 11 to mid-scale of its output range.

The insertion integrator 20 includes an integrating rate adjust control 22 which permits adjustment of the integration rate for the insertion integrator 20 during set up.

When operable in the proportional only mode, the insertion integrator 20 follows the command signal so that the transfer from proportional to proportional plus integral mode can be made without an immediate change in the output signal supplied to the actuator 12 by the insertion integrator 20.

By way of illustration, the proportional sensor controller may be the Type R93, commercially available from Penn Controls, Inc. The proportional sensor controller provides a DC command signal over a range of 0 to −16 volts. The actuator 12 may be a motor actuator circuit such as the type disclosed in the U.S. Pat. No. 3,742,327, of R. G. Nettles, which was issued on June 26, 1973. In a preferred configuration, the motor actuator circuit 12 supplies a −24 volt DC power signal to the proportional sensor controller 11 over conductors 14 and 15, conductor 14 being connected to ground and conductor 15 being connected to a −24 volt output of the motor actuator 12. A preferred embodiment for the insertion integrator 20, provided by the present invention, is described in the following detailed description which makes reference to FIG. 3 of the drawings.

DETAILED DESCRIPTION

Referring to FIG. 3, the insertion integrator 20 includes an amplifier circuit 31 having an input stage 32 consisting of an operational amplifier 33 and an output stage 34 including transistors Q1 and Q2. The insertion integrator circuit 20 further includes an input network 35 including resistors R2–R11, which permit the command signal and a reference signal to be extended to the operational amplifier, and a mode select switch S1. The operational amplifier 33 may for example, be the type 776 programmable operational amplifier, commercially available from Fairchild Semiconductor. The operational amplifier 33 has a pair of signal inputs 36 and 37, which correspond to pins 2 and 3, respectively, of the commercial unit and an output 38 which corresponds to pin 6 of the amplifier 33.

Power is supplied to the insertion integrator circuit 20 from the actuator 12, shown in FIG. 2, over conductors 14 and 15, which are at ground and −24 volt potential, respectively, and via conductors 14A' and 15A'. Conductor 14A' is connected to an input terminal 14B of the insertion integrator circuit, and conductor 14A", which extends conductor 14A' to the sensor controller, is connected to terminal 14C of the insertion integrator circuit 10. Similarly, conductor 15A' is connected to terminal 15B of the insertion integrator circuit 10, and conductor 15A" which extends conductor 15B to the sensor controller 11, is connected to terminal 15C of the insertion integrator circuit 10.

Current is supplied to the insertion integrator circuit 10 through a resistor R1 and a Zener diode Z1 clamps the voltage of point F at −16 volts. Resistors R2–R3, which are connected in series between point F and conductor 14A', establish a reference potential of approximately −8 volts at point A.

A potentiometer R5 and a resistor R9 are connected in series between points A and B. Resistors R6–R8 are connected in series between a wiper 40 of potentiometer R5 and the signal input 36 of the operational amplifier 33. Resistors R10 and R11 are connected between point B and the signal input 37 of the amplifier 33.

The command signal provided by the proportional sensor controller 11, shown in FIG. 2, is extended to the insertion integrator circuit 20 over conductor 16A, input terminal 16C of the insertion integrator 10 and over a resistor R4 to point B.

Resistor R4 is equal to the sum of resistors R5 and R9 so that the voltage at point B is at a level that is half way between Vin and the −8 volt potential at point A. This level is fed through resistors R10 and R11 to signal input 37 of amplifier 33. This is the proportional component of the output signal appearing at terminal 16D when the isertion integrator 10 is operable in the proportional plus integral mode. Resistors R10 and R11 are equal to resistors R7 and R8, respectively and match the resistance feeding signal input 37 of the amplifier to that feeding signal input 36 of the amplifier to lessen integrator temperature drift. Resistors R7 and R8 are the input resistors to the integrator.

Resistor R5 is a variable voltage divider with end resistance R9. Resistor R9 establishes the minimum integrator gain, and resistor R5 provides integrator gain adjustment. Resistor R6 allows points B and E to be shorted together in the proportional only mode without appreciably effecting the voltage at point B.

Resistors R4, R5 and R9 provide enough resistance so that the voltage at terminal 16C does not appreciably affect the −8 volt reference potential at point A. Resistors R6, R7, R8, R10 and R11 are of high enough resistance so as not to appreciably affect the voltage at point B.

The amplifier circuit 31 includes an integrating network 44 which enables the insertion integrator 20 to provide a component proportional to the time integral of the command signal, referenced to the reference voltage at point A, whenever the insertion integrator 20 is operable in the proportional plus integral mode. The network 44 comprises a resistor R12 and an integrating capacitor C2 which are connected in series between signal input 36 of the amplifier 33 and the output of the amplifier circuit 31 at point E, which is coupled over capacitor C1 to the output 38 of the operational amplifier 33. Resistor R12 is chosen small enough to have small effect on integrator action but limits current into the signal input 36 of the amplifier 33.

The operational amplifier 33 is followed by an output stage 34 consisting of resistors R15–R18, capacitor C1 and transistors Q1 and Q2.

Power is supplied to the operational amplifier 33 over resistor R16 which is connected between conductor 14A' and a positive supply terminal 43 of the amplifier 33 and a resistor R18 which is connected through resistor R1 between conductor 15A' and the negative supply terminal 44 of the amplifier 33.

Transistor Q1, which is normally non-conducting, has its emitter-base circuit connected in shunt with resistor R16 and its collector connected to point E at the output of the amplifier circuit 31. Similarly, transistor Q2, which is normally non-conducting, has its base-emitter circuit connected in shunt with resistor R18 and its collector connected to point E at the output of the amplifier circuit 31.

Resistors R15 and R17 are connected in series between conductor 14A' and resistor R1, which in turn is connected to conductor 15A'. Resistors R15 and R17 serve as load resistors for the amplifier 33. A resistor R20 is connected between the output of the amplifier circuit 31 at point E and ground via conductor 14A'.

Whenever a positive output swing is called for by the operational amplifier 33, the amplifier 33 draws current from input 43 and delivers the current to the load resistors R15 and R17 at the output terminal 38. When the voltage drop across resistor R16 increases due to such demand, transistor Q1 is turned on causing the output signal to swing in the positive direction.

Transistor Q2 operates in a similar way to supply power to the load from the negative supply for negative swings. Capacitor C1, which is connected between output 38 of the operational amplifier 33 and an output terminal 16D of the integrating circuit 20 at point E, provides frequency compensation for the insertion integrator 20.

The operational amplifier 33 has a programmable control input 45, pin 8 of the commercial unit, which is connected to the −16 volt supply at point F, over resistors R13 and R14. The operational amplifier 33 is turned on whenever current is drawn from terminal 45. Interruption of current flow from terminal 45 is achieved by connecting point C to ground through switch S1. This causes the operational amplifier 33 to be turned off, thereby disabling the insertion integrator circuit 20. When amplifier 33 is turned off, little or no current flows to the supply terminals 43 and 44. Thus, no base current is suppled to transistors Q1 or Q2, and accordingly, transistors Q1 and Q2 are then non-conducting. As will be described hereinafter, the mode select switch S1 controls the operational state of the amplifier 33.

The insertion integrator circuit 20 is operable in proportional only and proportional plus integral modes under the control of the mode select switch S1. The mode select switch S1, illustrated in FIG. 3, provides connections for the proportional plus integral mode of operation for the insertion integrator circuit 20. The illustrated mode select switch S1 is a triple pole double throw toggle switch. The switch S1 has a first pole 51 and associated contacts 52, 53, a second pole 54 having an associated contact 55 and a third pole 56 having an associated contact 57.

In the proportional plus integral mode position, pole 51 and associated contact 52 short resistor R6. The wiper 40 is then directly connected to the input resistors R7 and R8 which supply the integrating current to capacitor C2. Poles 54 and 56 are unconnected in the proportional plus integral mode.

In the proportional only mode, pole 51 and associated contact 53 serve to connect point B to the junction of resistors R6 and R7 at signal input 36 of the operational amplifier 33 to enable the command signal to be extended to the integrating network 44, permitting the insertion integrator capacitor C2 to follow the command signal while the insertion integrator circuit is operable in the proportional only mode. Accordingly, when the switch S1 is moved to the proportional plus integral position, there will be no instantaneous change in the charge of the capacitor C2, and hence, no significant bump in the output signal provided by the insertion integrator circuit 20.

When switch S1 is in the proportional only position, pole 54 and associated contact 55 connect ground extended over conductor 14A' to the junction of resistors R13 and R14 at the control input 45 of the operational amplifier 33 to disable the amplifier 33. Moreover, pole 56 and associated contact 57 connect the input of the insertion integrator circuit 20 at terminal 16C to the output of the insertion integrator circuit 20 at terminal 16D to enable the command signal provided by the proportional sensor controller 11 to be extended directly to the actuator 12.

Operation of the Insertion Integrator

For purposes of illustration of the operation of the insertion integrator 20, it is assumed that the mode select switch S1 is initially positioned to enable the insertion integrator 20 to provide proportional plus integral operation. In such position, the switch S1 shorts out resistor R6 and disconnects point C from ground so that the operational amplifier 33 is biased for normal operation. In addition, the switch S1 opens the connection between the input terminal 16C and output terminal 16D of the insertion integrator 20.

The voltage divider circuit 39 maintains point A at a −8 volt potential. The command signal is referenced to this −8 volt level. Accordingly, since the value of resistor R4 equals the sum of resistors R5 and R9, the combined value of the voltage VB at point B is maintained at a level ½ (Vin −8) volts by the voltage divider circuit 41. The reference voltage serves to reduce the gain of the command signal supplied to the amplifier circuit 31 by 50%, in the exemplary embodiment, providing a corresponding decrease in the proportional component of the output signal provided by the insertion integrator 20. The voltage VB is the proportional component of the signal output Vout of the insertion integrator 20 when the insertion integrator is operable in the proportional plus integral mode.

The signal input supplied to the input 36 of the operational amplifier 33 is the voltage VD-VB which is equal to −K (Vin +8) volts, the proportionality constant K being determined by potentiometer R5. The lower limit of K is established by resistor R9.

The integral component of the output signal Vout is the voltage across capacitor C2 which is the time integral of the voltage VD-VB. Since the summing junction is at the same potential as point B, the charging current into the integrating capacitor is: $i = -(K/[R7+R8])$ (Vin +8 volts).

The signal Vout provided by the insertion integrator is: Vout $= VB - 1/C2 \int i \, dt =$ ½ (Vin −8 volts) + $[K/(R7+R8)] [1/C1] \int$ (Vin + 8 volts) $dt$. The current $i$ is normally so small that the voltage drop across resistor R12 is neglected.

In operation, the dc command signal increases as the result of a decrease in the controlled variable. As the voltage at input terminal 16C increases relative to the reference voltage, the insertion integrator 20 provides a positive output signal drawing current for the amplifier 33 from the positive supply conductor 14 over conductor 14A' and resistor R16 to positive supply input 43. As the current through resistor R16 increases, transistor Q1 conducts, supplying an increasing voltage to the load. Also, capacitor C2 charges at a rate proportional to a voltage VA-VB. Thus, the insertion integrator 20 provides an output signal Vout at terminal 16D thereof, having a proportional component ½ (Vin −8 volts) and an integral component $[K/r7 +R8)] [1/C2] \int$ (Vin + 8 volts) $dt$ which is extended to the actuator 12 (FIG. 2). The actuator 12 responsively effects a change in the manipulated variable, such as the positioning of a damper, to effect a change in the controlled variable to return the controlled variable to the set point established by the set point control of the proportional sensor controller 11.

In a similar manner, when the command signal decreases relative to the reference signal, the insertion integrator 20 provides a decreasing output signal having a proportional and an integral component, with transistor Q2 being turned on to supply current to the load.

When the switch S1 is moved to the proportional only mode, the switch S1 connects point C to ground via conductors 14A' and 14 so that the operational amplifier 33 effectively becomes open-circuited between all terminals and is thus disabled. In addition, switch S1 interconnects the input terminal 16C and the output terminal 16D of the insertion integrator 20 to enable the command signal provided by the proportional sensor 11 to be extended directly to the actuator 12.

Moreover, switch S1 connects point B to the junction of resistors R6 and R7 at the input 36 of the operational amplifier 33 to which the integrating network 44 is connected. Accordingly, while the insertion integrator 20 is operating in the proportional only mode, capacitor C2 of the integrating network 44 is permitted to charge over resistors R7, R8 and R12 to a potential equal to Vout −VB. Thus, when insertion integrator 20 is subsequently switched to the proportional plus integral mode, there is no significant jump in the level of the output signal Vout provided by the insertion integrator 20.

I claim:

1. In a process control system, having a proportional control loop including sensor means for monitoring a controlled variable and for providing a linearly changing command signal indicating deviations of the controlled variable from a system set point, and actuator means responsive to the command signal to control a manipulated variable to effect a change in the controlled variable to return the controlled variable to the set point, an insertion integrator means interposed between an output of said sensor means and an input of said actuator means, said insertion integrator means including integrating amplifier means having an integrating network, and input means for extending said command signal to said amplifier means, switching means for enabling said insertion integrator means to be operable in a proportional plus integral mode in which said amplifier means is enabled to be responsive to said command signal to provide a modified command signal for said actuator means having a proportional component that varies linearly with said command signal and an integral component that varies in proportion with the time integral of said command signal, said switching means being operable to disable said amplifier means to cause said insertion integrator means to be operable in a proportional only mode in which said switching means connects said output of said sensor means to said input of said actuator means to permit said command signal to be extended directly to said actuator means and causes said command signal to be extended to said integrating network to permit said integrating network to follow said command signal while said insertion integrator means is operable in said proportional only mode to thereby permit bumpless transfer of said insertion integrator means from said proportional only mode to said proportional plus integral mode.

2. A process control system as set forth in claim 1 wherein said sensor means is operable to provide a dc command signal, said input means including reference means for establishing a further set point of a predetermined value for said insertion integrator means to enable said amplifier means to provide a modified command signal of a first polarity whenever said command signal is greater than said further set point value and to provide a modified command signal of the opposite polarity whenever said command signal is less than said further set point value.

3. In a process control system having a proportional control loop including sensor means for monitoring a controlled variable and for providing a linearly changing command signal indicating deviations of the controlled variable from a system set point, and actuator means responsive to the command signal to control a manipulated variable to effect a change in the controlled variable to return the controlled variable to the set point, an insertion integrator means interposed between said sensor means and said actuator means, said insertion integrator means including differential amplifier means having an integrating network connected between an output and an input of said differential amplifier means, and input means for extending said command signal to said amplifier means, said insertion integrator means being operable in a proportional plus integral mode to be responsive to said command signal to provide a modified command signal for said actuator means, said modified command signal having a proportional component that varies linearly with the command signal and an integral component that varies in proportion with the time integral of the command signal, said insertion integrator means including first means for reducing the amplitude of the command signal extended to said amplifier means by a predetermined amount whenever said insertion integrator means is operable in said proportional plus integral mode whereby the amplitude of the proportional component of said modified command signal is a predetermined amount less than the command signal provided by said sensor means, said insertion integrator means being operable in a proportional only mode to extend said command signal directly to said actuator means, and switching means for selecting the mode of operation of said insertion integrator means.

4. A process control system as set forth in claim 3 wherein said switching means includes a switch manually operable to effect the enabling of said differential amplifier means to permit said insertion integrator means to be operable in said proportional plus integral mode and to effect disabling of said differential amplifier means to permit said insertion integrator means to be operable in said proportional only mode.

5. A process control system as set forth in claim 4 wherein said switch is manually operable to connect said integrating network between an input and an output of said insertion integrator means for permitting said command signal to be extended to said integrating network to thereby enable said integrating network to follow said command signal whenever said insertion integrator means is operable in said proportional only mode of thereby permit bumpless transfer of said insertion integrator means from said proportional only mode to said proportional plus integral mode.

6. In a process control system having a proportional control loop including sensor means for monitoring a controlled variable and for providing a linearly changing command signal which is variable over a predetermined proportional range for indicating deviations of the controlled variable from a system set point, and actuator means responsive to the command signal to control a manipulated variable to effect a change in the controlled variable to return the controlled variable to the set point, an insertion integrator means interposed between an output of said sensor means and an input of said actuator means, said insertion integrator means comprising circuit means for providing a reference signal which corresponds in amplitude to the center of said proportional range for establishing a further set point for said insertion integrator means, and integrating amplifier means having an input connected to receive said reference signal and said command signal and operable when enabled to be responsive to said command signal and said reference signal to provide a modified command signal having a first component that is proportional to said command signal referenced to said further set point and a second component that is proportional to the time integral of said command signal referenced to said further set point, and switching means operable in a first mode to enable said amplifier means, said switching means being operable in a second mode to disable said amplifier means and to connect said output of said sensor means to said input of said actuator means to thereby extend said command signal directly to said actuator means.

7. In a process control system having a proportional control loop including sensor means for monitoring a controlled variable and for providing a linearly changing command signal which is variable over a predetermined proportional range for indicating deviations of the controlled variable from a system set point, and actuator means responsive to the command signal to control a manipulated variable to effect a change in the controlled variable to return the controlled variable to the set point, an insertion integrator means interposed between said sensor means and said actuator means, said insertion integrator means comprising first means including means for providing a reference signal corresponding in amplitude to the center of said proportional range to establish a further set point for said insertion integrator means, and second means operable when enabled to be responsive to said command signal to provide a modified command signal having a first component that is proportional to said command signal referenced to said further set point and a second component that is proportional to the time integral of said command signal referenced to said further set point, and switching means operable in a first mode to extend said command signal to said second means and to enable said second means to provide said modified command signal for said actuator means, said switching means being operable in a second mode to disable said second means and to extend said command signal directly to said actuator means.

8. A process control system as set forth in claim 7 wherein said second means includes operational amplifier means having first and second differential inputs connected to receive one-half the difference of said command signal and said reference signal and the sum of said command signal and said reference signal, respectively.

9. In a process control system having a proportional control loop including sensor means for monitoring a controlled variable and for providing a linearly changing command signal indicating deviations of the controlled variable from a system set point, and a controller means responsive to the command signal to control a manipulated variable to effect a change in the controlled variable to return the controlled variable to the set point, an insertion integrator means comprising differential amplifier means having first and second amplifier inputs and an amplifier output connected to an output of said insertion integrator means, first input means connecting said first amplifier input to an input of said insertion integrator means for receiving said command signal, second input means connected to said first and second amplifier inputs, said second input means including third means for reducing the amplitude of the command signal provided by said sensor means as extended to said insertion integrator means, and an integrating network means connected between said amplifier output and said second amplifier input, said differential amplifier means being operable when enabled to be responsive to said command signal and said reference signal whenever said command signal is unequal to said reference signal to provide a modified command signal having a proportional component and an integral component at said output of said insertion integrator means, and switching means operable in a first mode to enable said differential amplifier means to provide said modified command signal for said actuator means, said switching means being operable in a second mode to disable said differential amplifier means and to extend said command signal provided by said sensor means directly to said actuator means.

10. A process control system as set forth in claim 9 wherein said differential amplifier means comprises an input stage and an output stage, said input stage including programmable operational amplifier means having a control input connected to a bias source, said switching means being operable in said second mode to extend a disabling signal to said control input of said differential amplifier means to thereby inhibit the operation of said differential amplifier means.

11. A process control system as set forth in claim 10 wherein said differential amplifier means includes first and second supply inputs, first circuit means connecting said first supply input to a positive supply and second circuit means connecting said second supply input to a negative supply, said first and second circuit means being controlled by the modified command signal to supply current from the positive supply to said amplifier output whenever the modified command signal is of one polarity and to supply current from the negative supply to said amplifier output whenever the modified command signal is of the opposite polarity.

12. A process control system as set forth in claim 9 wherein said third means includes voltage divider means connected across a source of potential for providing a reference signal of a predetermined amplitude and circuit means interconnecting said first and second amplifier inputs and said voltage divider means whereby a signal proportional to the difference of said command signal and said reference signal is extended to said first amplifier input and a signal proportional to the sum of said command signal and said reference signal is extended to said second amplifier input.

13. In a process control system having a proportional control loop including sensor means for monitoring a controlled variable and for providing a linearly changing command signal which is variable over a predetermined proportional range for indicating deviations of the controlled variable from a system set point, and a controller means responsive to the command signal to control a manipulated variable to effect a change in the controlled variable to return the controlled variable to the set point, an insertion integrator means comprising differential amplifier means having first and second amplifier inputs and an amplifier output connected to an output of said insertion integrator means, first input means connecting said first amplifier input to an input of said insertion integrator means for receiving said command signal, second input means connected to said first and second amplifier inputs to extend to said first and second amplifier inputs a reference signal which correpsonds in amplitude to the center of said proportional range, and an integrating network including capacitor means, connected between said amplifier output and said second amplifier input, said differential amplifier means being operable when enabled to be responsive to said command signal and said reference signal whenever said command signal is unequal to said reference signal to provide a modified command signal having a proportional component and an integral component at said output of said insertion integrator means, and switching means operable in a first mode to enable said differential amplifier means to provide said modified command signal for said actuator means, said switching means being operable in a second mode to disable said differential amplifier means and to connect said integrating network between said input and said output of said insertion integrator means permitting said command signal to be extended to said integrating network to enable said capacitor means to charge to a valve proportional to the sum of said command signal and said reference signal, said command signal provided by said sensor means being extended directly to said actuator means over said switching means whenever said switching means is operable in said second mode.

14. A process control system as set forth in claim 13 wherein said second input means includes means for adjusting the integration rate for said insertion integrator means.

* * * * *